(12) United States Patent
Weber et al.

(10) Patent No.: US 7,020,710 B2
(45) Date of Patent: Mar. 28, 2006

(54) STREAMING MEDIA DELIVERY ON MULTICAST NETWORKS FOR NETWORK AND SERVER BANDWIDTH MINIMIZATION AND ENHANCED PERSONALIZATION

(75) Inventors: Barry Jay Weber, Carmel, IN (US); Kerry Wayne Calvert, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 198 days.

(21) Appl. No.: 10/177,514

(22) Filed: Jun. 21, 2002

(65) Prior Publication Data

US 2003/0236843 A1 Dec. 25, 2003

(51) Int. Cl.
 *G06F 13/00* (2006.01)
(52) U.S. Cl. .................. 709/232; 709/231; 725/96; 725/95
(58) Field of Classification Search ........ 709/230–232, 709/236, 224; 725/105, 135, 86–103
See application file for complete search history.

(56) References Cited

U.S. PATENT DOCUMENTS

| | | | |
|---|---|---|---|
| 5,778,187 A | 7/1998 | Monteiro et al. | |
| 5,953,506 A | 9/1999 | Kalra et al. | |
| 6,192,340 B1 * | 2/2001 | Abecassis | 704/270 |
| 6,248,946 B1 * | 6/2001 | Dwek | 84/609 |
| 6,263,313 B1 | 7/2001 | Milsted et al. | 705/1 |
| 6,389,467 B1 * | 5/2002 | Eyal | 709/223 |
| 6,459,427 B1 * | 10/2002 | Mao et al. | 725/109 |
| 6,546,421 B1 * | 4/2003 | Wynblatt et al. | 709/225 |
| 6,605,770 B1 * | 8/2003 | Yamane et al. | 84/609 |
| 2001/0053944 A1 * | 12/2001 | Marks et al. | 700/94 |
| 2002/0032019 A1 * | 3/2002 | Marks et al. | 455/414 |
| 2002/0067730 A1 * | 6/2002 | Hinderks et al. | 370/395.52 |
| 2002/0107940 A1 * | 8/2002 | Brassil | 709/219 |
| 2002/0184314 A1 * | 12/2002 | Riise | 709/205 |
| 2003/0220970 A1 * | 11/2003 | Komsi | 709/204 |

OTHER PUBLICATIONS

Goran Matic; Intelligent Multicast Internet Radio; Master of Science in Computer Science Dissertation; University of Dublin; pp. 1-94; Sep. 2002.*
Adam Field et al.; Personal DJ, An Architecture for Personalised Content Delivery; pp. 1-8; May 2001.*
Web Techniques: Sidebar Article found at http://www.webtechniques.com/archives/1999/12/bouthillier/.../1.shtm Mar. 1, 2001.
"Multicast Streaming: An Introduction" found at http://www.microsoft.com/windows/windowsmedia/en/serve/multiwp.asp Mar. 30, 2001.
ZDLABS Windows Media Server Unicast Streaming Test May, 2000.
International Search Report.

* cited by examiner

*Primary Examiner*—Kenneth R. Coulter
(74) *Attorney, Agent, or Firm*—Joseph S. Tripoli; Ronald H. Kurdyla; Joel M. Fogelson (57) ABSTRACT

A system for personalizing received transmissions includes a content source that provides multiple transmission streams over a transmission media. A plurality of receivers is included wherein each receiver selects portions of one or more of the transmission streams in accordance with a playlist for each user. The receiver renders the portions of the received transmissions in accordance with a schedule.

4 Claims, 5 Drawing Sheets

STREAMING MEDIA DELIVERY ON MULTICAST NETWORKS FOR NETWORK AND SERVER BANDWIDTH MINIMIZATION AND ENHANCED PERSONALIZATION

FIELD OF THE INVENTION

The present invention generally relates to network communications and, more particularly, to a method and system for providing personalized media delivery for network users while drastically minimizing the amount of bandwidth needed in the network and by a streaming server.

BACKGROUND OF THE INVENTION

Broadcast technologies often provide a single broadcast format to all listeners or viewers. For example, a radio station provides the same music or program to all listeners at the same time. One problem with this format is that most people want to listen only to music that they like. Radio stations attempt to satisfy most listeners by broadcasting music via in accordance with a varied playlist. However, the same listeners switch from one music station to another to get diversity when a song is played that they do not like. Traditional over-the-air stations are broadcast from one transmitter to many receivers, so personalization is not possible other than for blanket categories, such as the type of music, e.g., pop, classical, jazz, etc. In Internet radio, one-to-one personalization is more achievable. However, a dedicated channel from source to destination is required. This makes the cost of personalized Internet radio very high.

By broadcasting N radio stations for M users, where N/M is <1, some amount of personalization is achieved at the expense of the bandwidth to broadcast N playlists. The amount of bandwidth required is N*BW*M, where N is the number of radio stations, BW is the amount of bandwidth required per user and M is the number of users.

Utilizing multicasting in future systems may approach the bandwidth requirements needed for personalization (N*BW). In multicasting, the radio stations can send a single stream out to the world and the individual receiver removes personal preferences or selected data from the stream. The limitation in this scheme is that there are still only N available radio stations. For true personalization, the goal is to permit N to approach the value of M (the number of users).

One model for content delivery that is employed today is by streaming media files (such as MP3s or REALAUDIO™). Streaming servers have been deployed around a global network to enable real time delivery of content. This model typically does not allow true personalization since the same stream is being served to many people. A second model actually downloads files from a cached server. The cached music can minimize overall latency and network congestion, but in the end, users are required to perform a separate download. This model uses a lot of bandwidth, as well.

Therefore, a need exists for a method and system, which achieves personalization without the high bandwidth and server costs associated with the prior art.

SUMMARY OF THE INVENTION

A system for personalizing received transmissions includes a content source, which provides multiple transmission streams over a transmission media. A plurality of receivers is included wherein each receiver selects portions of one or more of the transmission streams in accordance with a playlist for each user. The receiver renders the portions of the received transmissions in accordance with a schedule.

A method for transmitting content to a plurality of users based on personal playlists includes generating a playlist for each of a plurality of users and simultaneously transmitting a plurality of content streams over a transmission media. The content streams include selected files transmitted at different times. The files in the playlist are identified and downloaded from one or more of the content streams, by each user, and the downloaded files played consecutively in accordance with a schedule.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not necessarily the only possible configuration for illustrating the invention.

DETAILED DESCRIPTION OF THE INVENTION

The present invention includes a method and system, which achieves personalization of play lists or video clips without the high bandwidth and server costs associated with conventional systems. The present invention employs a plurality of data streams of simultaneously broadcast audio or video to satisfy requests or play lists of a plurality of concurrent listeners/viewers. The present invention addresses both bandwidth limitations and personalized audio/video selections. In one example of the present invention, bandwidth savings of 1000 times can be achieved for a listener population of 200,000.

It is to be understood that the present invention is described in terms of an audio delivery system. While audio systems are illustratively described to demonstrate the present invention video systems may also employ the present invention. For example, the play list of a user may be preselected via an electronic programming guide (i.e., TV GUIDE™) where a user specifies the programming selections the user wants to view. The present invention is much broader than audio systems and may include any digital multimedia documents, which are capable of delivery over a network. In addition, the present invention is applicable to any ordering system (such as for ordering audio or video on demand) or method including playlist orders taken by telephone, set top boxes, computer, satellite links, etc. It should also be understood that the elements shown in the FIGS. may be implemented in various forms of hardware, software or combinations thereof. Preferably, these elements are implemented in a combination of software and hardware on one or more appropriately programmed general-purpose devices, which may include a processor, memory and input/output interfaces.

Figure 1:
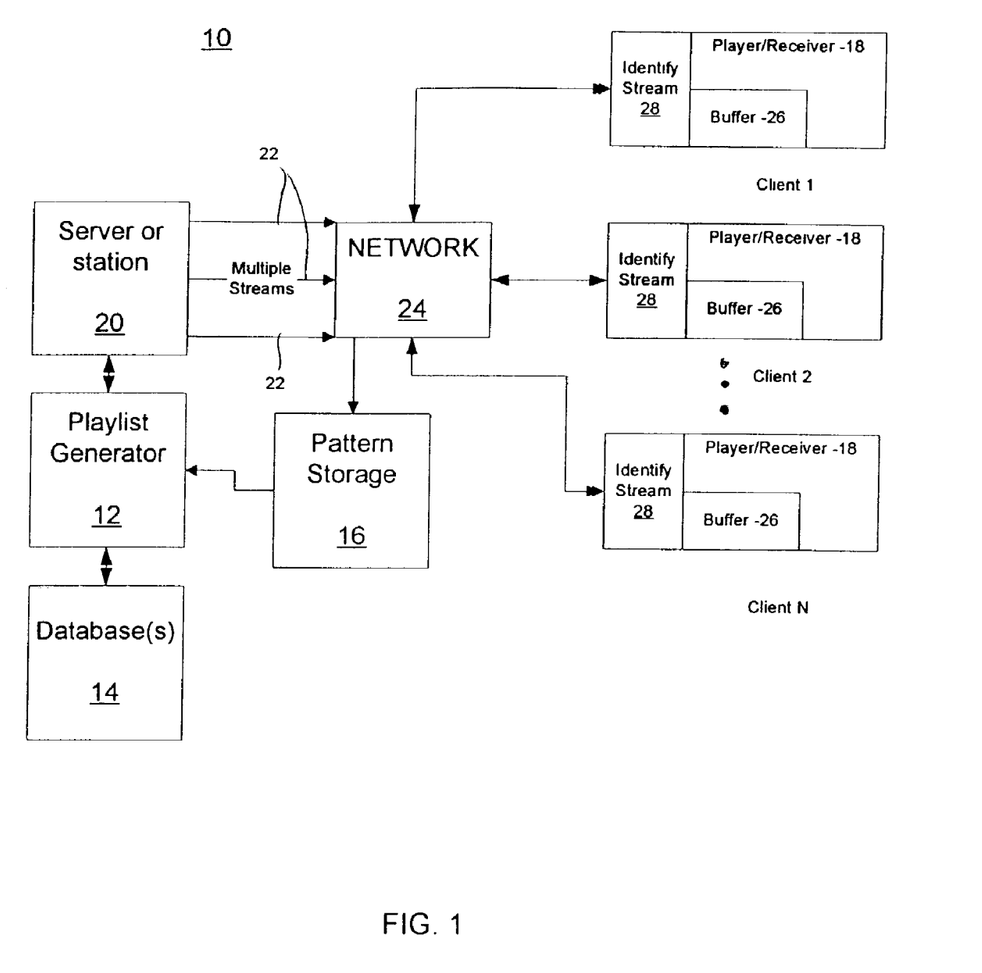
FIG. 1 is a block diagram of an exemplary system for personalizing received transmissions in accordance with one embodiment of the present invention.

Referring now in specific detail to the drawings in which like reference numerals identify similar or identical elements throughout the several views, and initially to FIG. 1, a block diagram depicts an illustrative system 10 for delivering a play list to a plurality of users in accordance with the present invention. While system 10 may be employed with any digital document, system 10 will be described in terms of an audio document delivery system for simplicity of explanation. Audio lends itself to the application of the present invention since the amount of bandwidth available on the network, the size of hard disk drives and the relatively short nature of the "events" are more easily handled with present technology. In addition, people are not accustomed to paying for broadcast audio (unlike video). Therefore, it must be supported by low margin advertising revenue, which makes it harder to deliver bandwidth for every user. If bandwidth can be shared, then the total amount of ad revenue needed to support the service is reduced.

Another assumption is that no user on the network will request the same song at the exact same time for true personalization. Therefore, it is possible that M users will be playing a portion of Song X, but not the same portion, or that M users will be fetching M songs. Conventional systems require all users to listen to the same song at the same time.

In FIG. 1, a plurality of users 1-N each interface with a personalized playlist generator 12 to generate a playlist of music, videos, clips or other titled data content. A database or databases 14 store the content, which will be delivered to the users in accordance with the following methods. Playlist generator 12 generates individual playlists based on user-selected content, or based on previous user selected content. Pattern storage 16 keeps track of individual usage patterns and may select songs to place in a schedule based on a user's prior use or to fill in space in a schedule where the user neglected or choose not to make any selections. Pattern storage 16 may also store demographic or personal information on a user. In this way, specific advertisements may be directed to a particular individual or class of individuals based on the stored data. Demographic information may include, among other things, age, sex, music/video preferences, listening/viewing times, etc.

Each of users 1-N have a player/receiver 18 suitable for reading data streams or transmissions from a server or station 20. Server/station 20 transmits multiple streams of data simultaneously over a network, on the air, over the Internet, or a combination thereof. Players 18 may include computer devices, telephones, televisions, radios or any other device capable of receiving and using the data content transmitted through data streams 22. In particularly useful embodiments, players 18 are able to find files or clips corresponding to a users playlist from one or more data streams 22.

Players 18 communicate with network 24 and server 20 via employing appropriate protocols, e.g., IP/TCP. Network 24 may include a wireless network, broadcast network, satellite network, digital subscriber line network, wired telephone or cable network or any other network type. Players 18 preferably include memory or buffers 26 to provide temporary storage of content to be rendered in a next or future time slot during a schedule. Players 18 include software programs 28 capable of identifying which data streams include which files or content needed in accordance with playlists of the individual user. Data streams 22 may carry header information in packets, which can be stripped and identified by the players 18 to make this identification.

Figure 2:
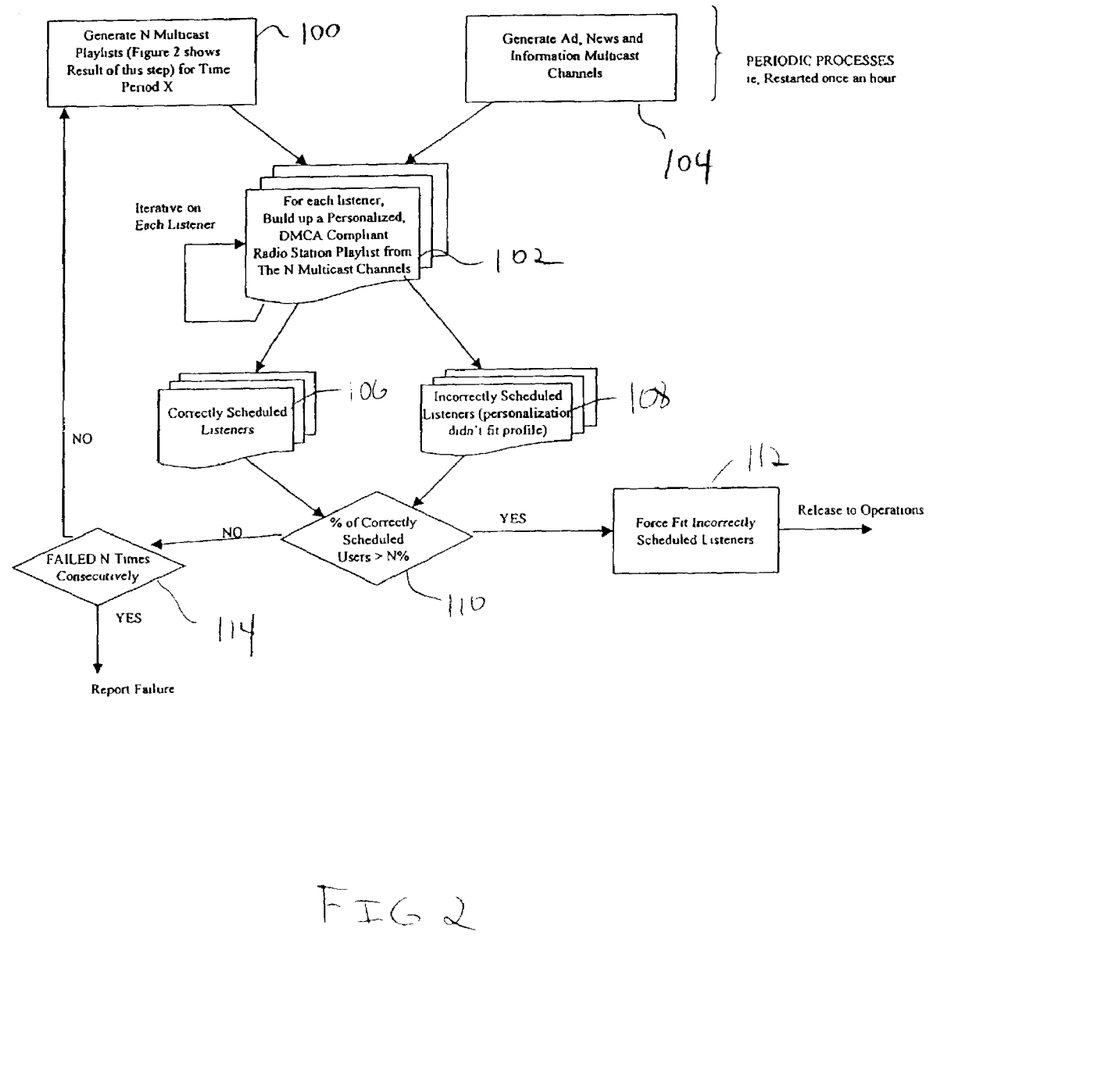
FIG. 2 is a flow chart of an illustrative method for scheduling personalized playlists in accordance with one embodiment of the present invention.

Referring to FIG. 2, playlist generation is performed in block 100. The present invention may use already known concepts, such as profiling which permits playlists to be generated for a user based on an observed listening (or watching) habit. Many algorithms exist for performing the association between users and the type of music and/or the song preference. In block 102, a personalized playlist is scheduled. Generating a personalized playlist may employ known methods. However, the present invention includes a method for building playlists that are synchronized with a multicast broadcast schedule.

In accordance with the present invention, a station broadcast is comprised of 1 to N multicast channels. Each channel simultaneously transmits a data stream; each data stream includes a plurality of songs, videos, clips, ads or other content, in block 104. The playlists of the users in block 102 include instructions on which multicast channel should be attached to by the user, and the time that the attachment should be made. While the user is listening to a song, the user will attach to a different multicast channel to pre-buffer the next song so that when the current song ends, there is a smooth transition to the next song. In this description, "song" is used to denote music, video, advertisements and other digital document or clip.

In an optional embodiment of block 104, the invention would restrict a user to songs that the user can access lawfully, as to comply with copyright laws via a copy protection method. As an example of this embodiment, a user may subscribe to a service that allows access to songs available on the RCA music label, whereby the user can only select songs on their playlist (from RCA) that are available through the subscription. Similarly, this idea may be translated to visually based programming, as pay television, where a user would be able to select playlist selections from HBO but not CINEMAX, if the user did not subscribe to CINEMAX programming. This copyright information may be identified as a control flag embedded in a data field corresponding to a media file (for example, 1 enabling access and 0 restricting access), or by other means (e.g., an file id as a MP3 tag corresponding to a media file) that can be compared to database 14 (from FIG. 1) to determine if a user has access to that media file.

The scheduling process fits content into time schedules or slots and determines when listeners/users are correctly scheduled (block 106) or incorrectly scheduled (block 108). Correctly and incorrectly scheduled users are based upon whether playlists, commercials and fill can be accommodated with a given time period. The multicast channels are searched for a song that will match the user's profile and can be attached to the schedule in the appropriate time frame. If no song meets these criteria, a different multicast channel is selected as the starting point for the user and the algorithm repeated. If a solution for the user is not found, the user is marked as unscheduled, in block 108, and the next user is processed.

In block 110, a percentage of the amount of correctly scheduled content is compared to a threshold. If the amount exceeds the threshold, then the remainder of the content for time schedules of incorrectly scheduled listeners can be force fit to complete the content needed in the time period, in block 112. If the percentage of unscheduled users is analyzed and the number exceeds the threshold established by the station operator, those songs, which had the highest number of rejection counts, may be discarded from the playlist selections, and replaced with new selections. The scheduling steps are repeated, as needed.

If repeated attempts to schedule do not arrive at a solution, nonscheduled users are then force fit into a schedule that results in the least non-compliant selections for them, in block 112. It is resolved at this point that the station's inventory is not matching their user community, and management reports should be derived from the scheduling data to allow the station to make inventory adjustments.

Otherwise, in block 114, consecutive failures in correctly fitting the time schedule are reported. Then, the program path returns to block 100 to be repeated.

Figure 3:
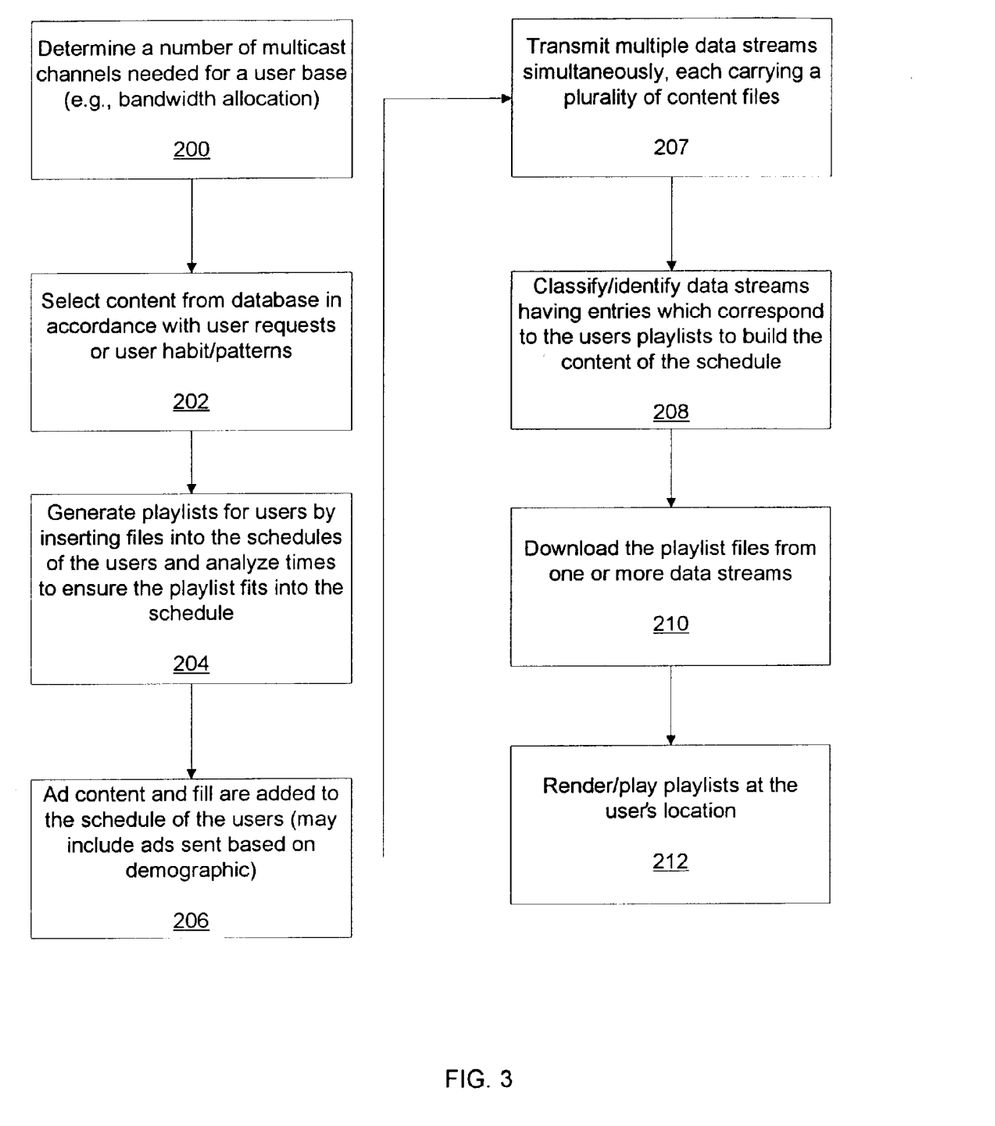
FIG. 3 is a flow chart of an illustrative method for transmitting content to a plurality of users based on personal playlists in accordance with one embodiment of the present invention.

Referring to FIG. 3, the generation of playlists in accordance with the present invention will be described in greater detail. In block 200, a number of multicast channels to be allocated to servicing the user base are determined by the user system. The determination is made by including input such as the bandwidth available for allocation to the station, the number of users, and the percentage of songs in the inventory that are of shared interest to the users. In block 202, songs or files are selected from the database using user selections or by using profiling information available for the users to ensure a selection of songs/files that are known to be popular. The profiling information may include user selected songs or information or may be selected by the system in accordance with information known about the user. The most popular songs may then be augmented with new less popular material.

In block 204, songs/files are inserted into the schedule for a plurality of multicast channels. The popular songs are distributed across the schedule time to allow higher probability of schedule fulfillment for a given user. The playtime for the song is analyzed so that the total playtime for all songs in the list does not exceed a schedule period. In block 206, ad content and audio filler are inserted into a multicast channel. Since there will (presumably) be less ad content than program content, the ads are repeated throughout the schedule. The repeated ads allow the scheduler more flexibility to select ads that can fit into the times available at different stages of the user's virtual broadcast.

Multiple data streams are transmitted over the air or over a network, in block 207 (see, e.g., FIG. 3). In block 208, the selection list is built for each user by pointing the user to a multicast channel until the next song in the channel does not fit the user's profile. The other multicast channels will be searched for a song that will match the user's profile and can be attached to in the appropriate time frame. If no song meets these criteria, a different multicast channel is selected as the starting point for the user and the algorithm repeated. If a solution for the user is not found, the user is marked as unscheduled, and the next user is processed. (See FIG. 2)

In block 210, all correctly scheduled users download their files from the multiple data stream channels. In block 212, the users render or play the playlist in accordance with their individually selected files or in accordance with the habits of the listening/viewing population or their own individual habits.

Figure 4:
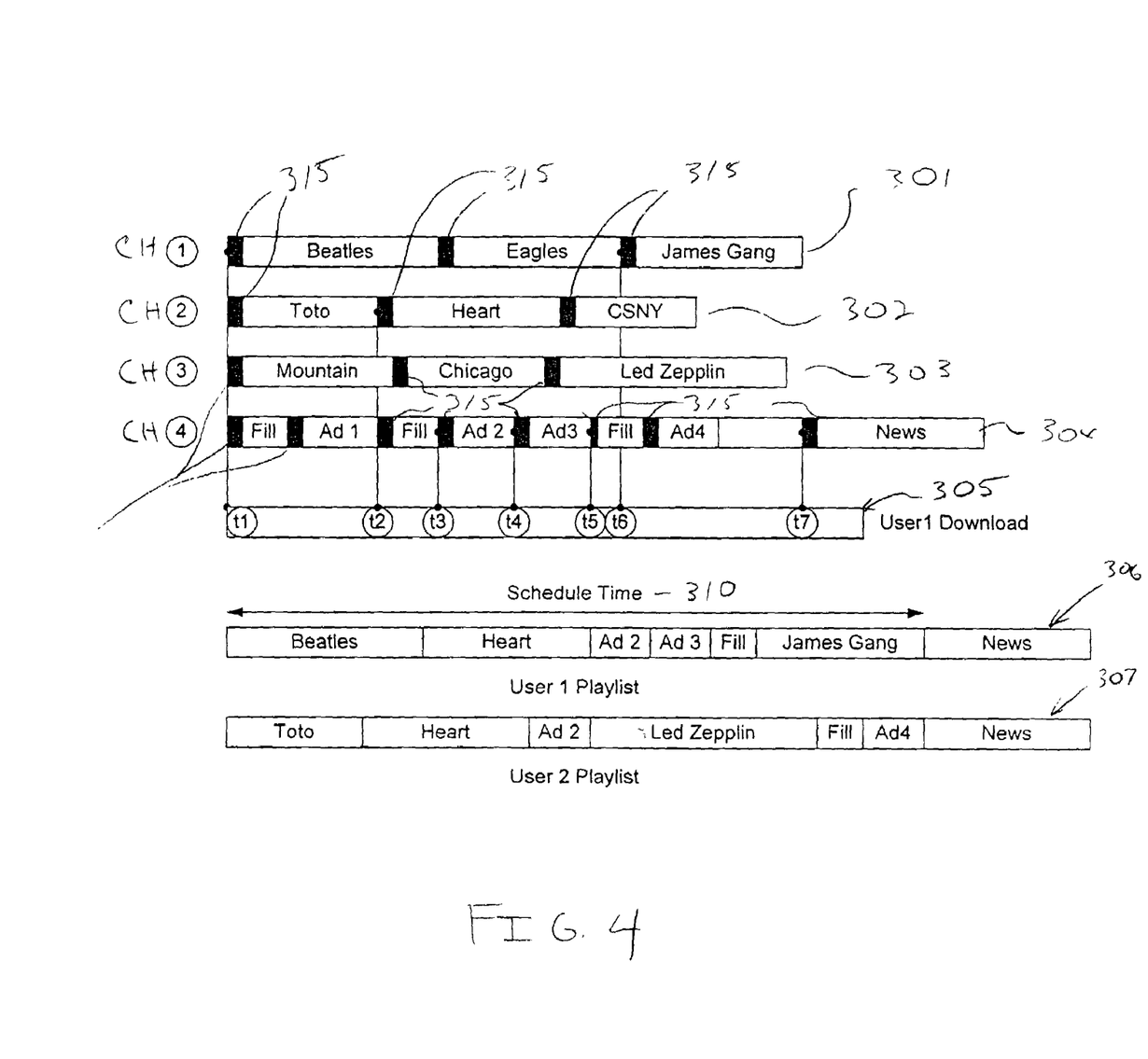
FIG. 4 is a timing diagram showing content scheduling and transmitting to a plurality of users in accordance with one embodiment of the present invention.

Referring to FIG. 4, items 301, 302, 303 and 304 represent an illustrative sequence of a media broadcast on different multicast channels. The inventory loaded in each multicast channel is slated to have a playtime that aggregates to something less than a desired schedule time. Although the number of channels depicted is 4, in practice the number of channels could be much greater.

The scheduling method builds the play list for a given user by selecting songs from multicast channels (CH) 1, 2, or 3 and advertisement content and/or fill content from multicast channel 4 such that the total play time for a given user will be equal to a schedule time 310. In this example, at the end of the schedule time 310, a synchronized event for all users (a newscast) may be played.

Item 305 illustrates a download schedule for User 1 of the system. When the user connects to the station, the schedule of item 305 is downloaded, and the user's player will interoperate with the station according to the schedule. Items 306 and 307 illustrate the playback sequence for 2 unique users (e.g., user 1 and user 2) of the system. A download schedule as depicted in item 305 is not presented for user 2, but is derived in an equivalent fashion to user 1. The schedule of user 2 is developed independently of the schedules of other users and is created based on the individual user preferences or handpicked playlist. In this way, the present invention provides true personalization of the playlist received and played by individual users.

When the user first connects to the station, it may be that the user cannot be started at the beginning of a schedule time period. The scheduler will do a best-fit selection for the first schedule it presents to the user that will allow the user's second schedule to be synchronized to a schedule time period. As such, the user's first song may not necessarily start at the beginning of the song. This behavior matches the current experience of users that turn on an FM/AM analog broadcast, in that the user picks up the broadcast in progress. Another possible implementation is that one song can be kept loaded on the hardware, memory permitting. This stored song could be used to help with instantaneous playback start and synchronization.

The following description of the invention assumes that the user has progressed past the initial startup schedule of a user and is preparing to process a new schedule for a full schedule time period. It should be noted that the concept of a schedule period is not needed for the present invention. A station may choose to not drive all users to a schedule synchronization point (that is, not use scheduling periods). For example, one user may hear the hourly news broadcast at 8 AM, and another hear the same broadcast at 8:03 AM.

Referring again to FIG. 4, a description of a user playback model will now be described. At t1, user 1 downloads a Beatles song from multicast channel 1. The Beatles song is played in item 306 at the start of the schedule time 310. Downloading of material from the multicast channels is scheduled to start before the start of the schedule time period to allow time for a connection to the channel to be established, and to allow for adequate buffering of data for playback. In accordance with one aspect of the present invention, music, data, or other transmitted content can be compressed and or transmitted at a higher bit rate than the play rate. For example, if the play rate of the user's radio plays at a rate 6000 bits per second, then the transmission rate can be, e.g., 600,000 bits per second or greater. Since the actual content to be played may be received and buffered, a greater number of songs can be transmitted in a shorter period of time.

User 1's profile indicates that the user has skipped an upcoming Eagles song on multicast channel 1, so the Heart selection on multicast channel 2 is selected instead. At t2 the User 1's player attaches to multicast channel 2 to start downloading the Heart selection while the Beatles selection is still playing.

When User 1's player detects the stream information marker that precedes the Eagles selection; it will start playing the Heart selection from its cache. User 1's player then evaluates its schedule and determines that it must attach to multicast channel 4 by time t3 to start downloading advertisement 2 for playback when the Heart selection is complete. The schedule then indicates that at time t4 the user should start downloading advertisement 3. Note that at this time, the player that is playing the Heart selection, has cached advertisement 2, and is now adding advertisement 3 to the end of that cache.

The next download for the schedule calls for retrieving the Fill at t5. Fill clips are specially crafted blocks of audio that have some fixed amount of audio that is played followed by a block of audio that is repeated to fill out the time gap as needed. An example would be a station announcement such as "This is KLPX, Indianapolis", followed by a music block. The stream information packet that precedes the fill includes information about how many bytes in the following audio includes the prefix, the playback time of that prefix, and the playback time of the repeating audio that follows the prefix.

Figure 5:
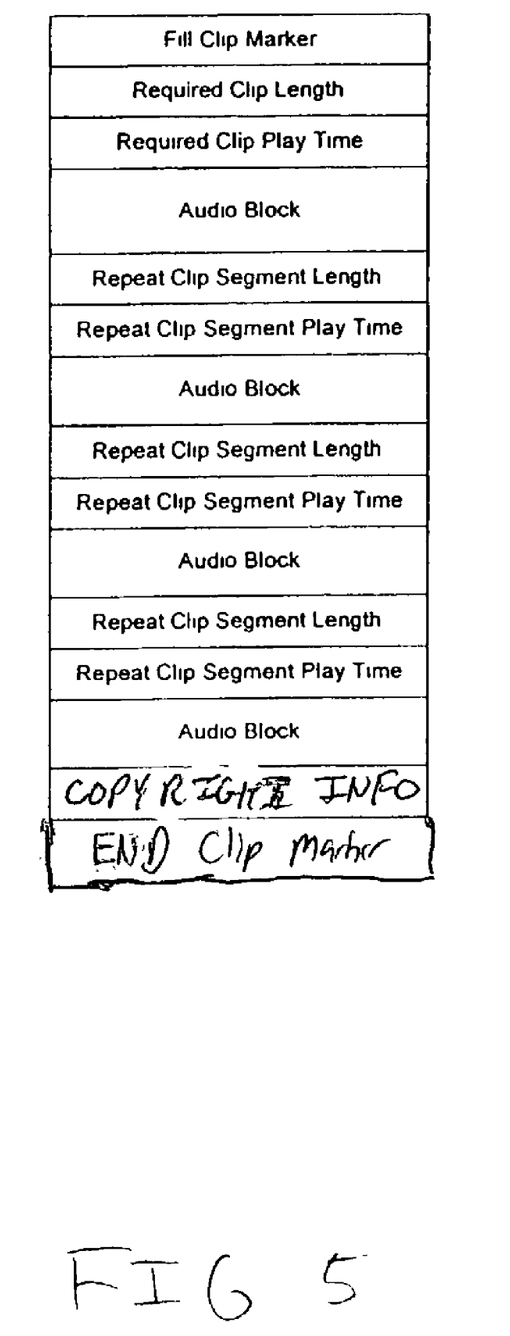
FIG. 5 shows an illustrative data layout for content fill in accordance with the present invention.

The player then evaluates its schedule to determine how much time the fill block occupies, and renders the audio accordingly. The playback time of the repeating audio block may require granularity of less than a second for proper control of the time alignment, and as such the implementation of the present invention may choose to encode multiple repeating audio blocks to allow the player better control. An example of a layout of this type of fill clip data is illustrated in FIG. 5.

At time t6 and t7, user 1's player downloads the final two selections (James Gang and News) and plays them sequentially after completing the playing of the Fill audio. This completes the playlist for the schedule time, and user 1's player then requests its next playlist schedule to start the process over again.

The user may connect to a station via a standard IP/TCP connection. Other connections are also contemplated for the present invention. For example, radio frequency transmissions, cable transmissions or satellite transmissions may also be employed. The user retrieves a playback schedule (e.g., item 305). The schedule may include, e.g., the IP address for each of the multicast channels indicated in the schedule, and the user will issue a multicast connect request to the appropriate IP address at the time indicated in the schedule, allowing enough time ahead of the scheduled time for the multicast connection to propagate through the network and be established.

Each of the multicast channels 1, 2, 3 and 4 in FIG. 4 are broadcast simultaneously from the station's server. The user will receive data from the multicast channel starting at the time the connection is made, with no additional synchronization. The player synchronizes to the multicast channel broadcast by looking for a stream information marker 315. If the marker is not retrieved by the time indicated in the schedule, the player assumes that it simply missed the marker, and should start rendering the buffers it receives. If the player received buffers for the scheduled selection (as indicated in buffer headers that are transmitted with the selections of audio data), the player may opt to establish a TCP connection with the server to request the missed blocks of data. If buffer integrity cannot be obtained by the time the current selection has stopped playing, the player can optionally play what it can from the new selection, and use a filler block at the end of the selection to avoid "dead air", or it can request a new schedule from the server so that it can resynchronize.

The present invention is particularly useful, when the bandwidth savings derived from utilizing multicasting are large in relation to the processing costs for implementing the scheduling algorithm for large numbers of users. In one embodiment, the expected reduction in bandwidth costs will depend on the amount of commonality among playlists. The following example illustratively shows a possible bandwidth reduction for a given set of circumstances.

M=Minutes/hour of Music=40
A=Minutes/hour of Advertisement=20
L=Length of Average Song=3
N=Number of Multicast Channels
S=Streaming rate
U=Users In this example, 200 multicast channels are allocated for broadcast. If the schedule time horizon is 1 hour, there would be (M/L*N) or (40/3*200= 2666) possible song selections to schedule from. If a user likes 50% of the songs in the station's genre, then there is a 1% [(M/L)*N*0.50] chance per song selection that the user would reject it. The ability to arrive at a successful scheduling solution when it only requires 13 successful picks from 1333 possibilities per hour should approach 100%.

Given the successful scheduling solution, the bandwidth requirements to support the station is N*S. For non-multicast stations the bandwidth requirement for a non-personalized (everyone listens to the same program) is U*S. For a user base of 200,000 listeners, the bandwidth savings for the invention are (200,000/200=1000%).

In current networking terms, the present invention in this example may use two T1 channels to support multicasting to 200,000 users. A non-multicast station may require 1000 T1 channels, and this would require a large router farm to provide this support as well. The cost savings are considerable in this scenario.

Video streams have higher bandwidth requirements and need more memory for buffering in the playback device. The present invention, as described, is applicable to video with the higher bandwidth requirements. To support a video application in the example described above, 400 T1 channels would be needed to support 200 multicast channels. As current network and switching technology advances and matures, the present invention can easily be employed to service large-scale video multicasting.

If a downloaded song appears too corrupted, software in a player device can re-request it, or possibly even implement a smart patch program and FTP those portions that were missed. Another solution would be to simply skip over that song, although the listener may have already seen that it was going to be the next one played, e.g., on a displayed playlist.

Optionally, one embodiment of the present invention supports a user ranking playlist selections where the programming corresponds to temporal and/or subject preferences. For example, a user selects a preference for news in the morning and music in the evening. The invention would consider the temporal, subject, specific programming, or a combination thereof when coordinating the user's playlist with other playlists in order to deliver programming selections.

Having described preferred embodiments for streaming media delivery on multicast networks for network and server bandwidth minimization and enhanced personalization (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for transmitting content to a plurality of users based on user profile information, comprising the steps of:

using said user profile information to select at least one of audio and video files to be transmitted over a plurality multicast channels, selecting at least two multicast channels from said plurality of multicast channels to transmit said at least one audio and video files, wherein said selecting step considers available bandwidth and number of users to which said at least one audio and video files are to be transmitted in order to determine how many multicast channels are to be selected; and said number of users is greater than one; and transmitting said at least one said audio and video where each file is being transmitted at a frequency over a same or a different content stream such that a given file is made available, in accordance with a schedule, to satisfy a playlist associated with a user from said number of users.

2. The method as recited in claim 1, wherein the content of said playlist is selected by said user.

3. The method as recited in claim 1, further comprising the step of directing advertisements to said user based on demographic information.

4. The method as recited in claim 1, further comprising the step of computing schedules for said number of users based on playlists associated with each user of said number of users.

* * * * *